United States Patent
Bergold et al.

(10) Patent No.: US 6,571,135 B2
(45) Date of Patent: May 27, 2003

(54) CONTROL UNIT FOR CONTROLLING A SYSTEM WITH SEVERAL COUPLED VARIABLES

(75) Inventors: Stefan Bergold, Karlsrushe (DE); Madhukar Pandit, Kaiserslautern (DE); Bernd-Markus Pfeiffer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 09/828,238

(22) Filed: Apr. 9, 2001

(65) Prior Publication Data

US 2002/0022892 A1 Feb. 21, 2002

Related U.S. Application Data

(63) Continuation of application No. PCT/DE99/03245, filed on Oct. 8, 1999.

(30) Foreign Application Priority Data

Oct. 8, 1998 (DE) .......................................... 198 46 447
Apr. 29, 1999 (DE) .......................................... 199 19 595

(51) Int. Cl.$^7$ ............................................. G05B 13/02
(52) U.S. Cl. ............................. 700/42; 700/19; 700/34; 700/41; 700/67; 700/73; 700/74; 318/609; 318/610
(58) Field of Search ........................... 700/19, 20, 34, 700/40, 41, 42, 43, 46, 52, 53, 67, 68, 73, 74; 318/609, 610

(56) References Cited

U.S. PATENT DOCUMENTS

| | | |
|---|---|---|
| 4,008,386 A | 2/1977 | Ross |
| 4,268,784 A | 5/1981 | Ganaway |
| 5,148,361 A * | 9/1992 | Braun et al. .................... 363/95 |
| 5,315,257 A * | 5/1994 | Guillard et al. ............. 324/627 |
| 5,400,247 A | 3/1995 | He |
| 5,541,833 A | 7/1996 | Bristol et al. |
| 5,994,867 A * | 11/1999 | Birk et al. ................... 318/609 |
| 6,128,586 A * | 10/2000 | Pfeiffer ....................... 702/127 |
| 6,501,998 B1 * | 12/2002 | Pfeiffer ......................... 700/37 |

FOREIGN PATENT DOCUMENTS

| | | |
|---|---|---|
| DE | 24 47 632 | 4/1976 |
| DE | 268 789 A1 | 6/1989 |
| DE | 39 13 053 C2 | 11/1989 |
| DE | 41 00 064 A1 | 7/1991 |
| DE | 41 20 796 A1 | 1/1993 |
| DE | 32 40 809 C2 | 5/1994 |
| DE | 195 10 324 A1 | 9/1996 |
| DE | 197 29 632 C1 | 4/1999 |
| EP | 0 707 718 B1 | 4/1996 |

OTHER PUBLICATIONS

Musch, H.E. et al.; $\mu$–Optical Advanced PID Control of an Industrial High Purity Distillation Column, Proceedings of the Conference on Control Applications, IEEE. Bd Conf 3, Aug. 1994, pp. 281–288.

(List continued on next page.)

Primary Examiner—Ramesh Patel
(74) Attorney, Agent, or Firm—Sughrue Mion, PLLC

(57) ABSTRACT

For controlling multivariable systems, a control unit for controlling a system with several coupled control variables. The control unit includes controllers (10, 11) having associated control variables ($x_1$, $x_2$) as well as a decoupling network. The decoupling network is connected upstream from the system and includes at least one first decoupling member (12). A first output variable ($y_1$) of a first one of the controllers (10) is routed to the first decoupling member (12). The first decoupling member generates a first correcting quantity (14) for a second output variable ($y_2$) of a second one of the controllers (11). The second controller (11) has a PI- or PID-controller core (40) and is configured such that integrator windup is eliminated when the second output variable ($y_2$) corrected with the first correcting quantity (14) reaches a manipulated variable limit. Bumpless manual/automatic changeover of the controller is also made possible.

9 Claims, 3 Drawing Sheets

OTHER PUBLICATIONS

Engel, W., "Grundlegende Untersuchungen über die Entkopplung von Mehrfachregelkreisen", "Regelungstechnik,", vol. 14, No. 12 1966, No. 12, pp. 562 to 568.

Lunze, J., Regelungstechnik II: Mehrgrössensysteme, Digital Regelung, Springer 1997, pp. 307 to 326.

Bergold et al., "Eine kompake Darstellung der Strunktur modell praediktiver Regelungsverfahren fuer Mehrgroessensyteme", at–Automatisierungstechnik, vol. 46, No. 10, 1998, pp. 468–477.

Foellinger, O., "Regelungstechnik", Huethig 1990 (6$^{th}$ ed.), p. 365–386.

* cited by examiner

CONTROL UNIT FOR CONTROLLING A SYSTEM WITH SEVERAL COUPLED VARIABLES

This is a Continuation of International Application PCT/DE99/03245, with an international filing date of Oct. 8, 1999, which was published under PCT Article 21(2) in German, and the disclosure of which is incorporated into this application by reference.

FIELD OF AND BACKGROUND OF THE INVENTION

The invention relates to a control unit for controlling a system with several coupled variables.

The paper by W. Engel entitled "Grundlegende Untersuchungen über die Entkopplung von Mehrfachregelkreisen" [Basic Investigations on the Decoupling of Multiple Control Loops] published in "Regelungstechnik," 1966, Number 12, pp. 562 to 568 already discloses a control system for a process in which several variables that reciprocally influence one another are controlled. The P-canonical and V-canonical structures are indicated as possible ways to describe a process with several coupled control variables of a so-called multivariable system. If nothing is known about the relationships and the signal shape within a multiple control system it is proposed to select the P-canonical structure for simplicity's sake. In a P-canonical structure of a transmission system, each output variable depends on the input variables but not on other output variables. FIG. 1 shows a block diagram of a 2×2 multivariable system in P-canonical structure. The input variables are labeled $y_1$ and $y_2$ and the output variables $x_1$ and $x_2$. In a controlled system, the input variables $y_1$ and $y_2$ represent manipulated variables provided to actuators, while the output variables $x_1$ and $x_2$ represent metrologically recorded control variables of the controlled system. The structure shown may be readily expanded for a different number of inputs and outputs as discussed in the aforementioned paper by Engel for an n×n system. The two transfer functions $g_{11}$ and $g_{22}$ between the input variable $y_1$ and the output variable $x_1$, or between the input variable $y_2$ and the output variable $x_2$, are referred to as main systems, the transfer functions $g_{12}$ and $g_{21}$ between $y_2$ and $x_1$ or between $y_1$ and $x_2$ are referred to as coupling systems.

The P-canonical structure has the advantages both that it is clear for the user and that conventional methods may be used to identify the transfer functions in the main systems and the coupling systems. A suitable identification method is described, for instance, in German reference DE 41 20 796 A1. The identification of the transfer functions $g_{11}$ and $g_{21}$ may be carried out in accordance with the conventional method by keeping input variable $y_2$ constant and using input variable $y_1$ to apply an excitation function to the transfer elements, i.e., to the system to be controlled. From the responses of the output variables $x_1$ and $x_2$, a suitable transfer function $g_{11}$ or $g_{21}$ can be calculated. Analogously, the transfer functions $g_{12}$ and $g_{22}$ should also be determined with a constant input variable $y_1$.

The aforementioned paper by Engel, which is incorporated into the present application by reference, further states that such a multivariable system may be controlled by a device depicted in FIG. 2. The principal structure is again described by means of a 2×2 multivariable system, which is provided with identical reference numbers as those used in FIG. 1. A decoupling network 2 in P-canonical structure is connected upstream from the multivariable system 1. Decoupling members 3 and 4 realize transfer functions $k_{21}$ and $k_{12}$, respectively, which may be determined, for instance, by the method described in the paper by Engel. The task of the decoupling members $k_{21}$ and $k_{12}$ is to reduce the extent of coupling within the multivariable system 1, which in the control loop shown represents the system, so that the precompensated system 5, formed by system 1 and the decoupling network 2 that precedes it, is approximately decoupled. In this case, approximately decoupled means that the effective paths from an output signal $u_1$ of a controller 6 with a transfer function $r_{11}$ to the control variable $x_2$ and from an output signal $u_2$ of a controller 7 with a transfer function $r_{22}$ to the control variable $x_1$ are without significance for the configuration of the control transfer functions $r_{11}$ and $r_{22}$. In the ideal case, there is no longer any effective connection between the output variable $u_1$ and the control variable $x_2$ or between the output variable $u_2$ and the control variable $x_1$. The precompensated system 5 is thus separated into two single-variable systems with the input variable $u_1$ and the output variable $x_1$, or with the input variable $u_2$ and the output variable $x_2$, for which a single variable controller 6 or 7 may be configured. A suitable configuration method for PI or PID controllers in single variable systems is, for instance, the magnitude optimum known from European Patent EP 0 707 718 B1.

The control unit shown in FIG. 2 may be readily implemented in a process control system. Various controller types and summation points are usually available as function modules. Thus, only the decoupling members must be newly implemented.

The described control unit exhibits good control response in linear operation. No strategy is known, however, which may be used to deal advantageously with non-linear cases, which occur in practice, e.g., if the manipulated variable $y_1$ runs into its limit or if the controllers 6 or 7 are switched between manual and automatic operation.

OBJECTS OF THE INVENTION

One object of the present invention is to provide a control unit to control a system with several coupled control variables, which is characterized by an improved control response.

SUMMARY OF THE INVENTION

To attain this and other objects, the novel control unit of the aforementioned type has controllers each of which is associated and has a control variable with a decoupling network connected upstream from the system. The decoupling network has at least a first decoupling member to which the output variable of a first controller is routed and which generates a first correcting quantity for the output variable of a second controller, to reduce the coupling between the control variables. The second controller has a PI or PID controller core and is configured such that the value of the integral action component and the output variable of the second controller are kept constant when the output variable of the controller core of the second controller corrected with the first correcting quantity reaches a manipulated variable limit. Additional embodiments are also described below.

The invention has an advantage that the control variable, even if the associated manipulated variable was previously at the manipulated variable limit, quickly responds to a sign change in the corresponding control deviation at the input of the controller. The reason for this is that the manipulated variable change performs a change in its sign immediately after a sign change in the control deviation, since the so-called integrator windup, i.e., the runaway of the integrator of a PI or PID controller, is eliminated while the manipulated variable is at its limit. If only one decoupling member is used in a multivariable control, it is sufficient to detect a manipulated variable limit merely by means of the output variable of the corresponding controller, which is corrected by the correcting quantity of the decoupling member, and to use a suitable strategy to eliminate integrator windup.

Various strategies are possible to eliminate integrator windup. One option is to keep constant the state, i.e., the value of the integral action component and the output of the controller when the controlled variable limit is reached. Another option for eliminating integrator windup is to switch a determined quantity instead of the control deviation to the controller core, as long as the corrected output variable would reach or would exceed the manipulated variable limit if the control deviation were applied to the controller core, so that the corrected output variable of the controller corresponds to the value of the manipulated variable limit. This option is described in detail in the European Patent EP 0 707 718 B1, to which reference is made for further details, and which is incorporated by reference into the present application.

Advantageously, a standard controller is used, which already integrates both a device for eliminating integrator windup in a manipulated variable limit as well as a device for feedforward control to which the first correcting quantity may be routed. In this case, the decoupling member clearly generates the first correcting quantity after a transfer function, for which a decoupling network is determined in P-canonical form.

If there are reciprocal couplings of the control variables in a system, the control response of the multivariable control may be advantageously improved by a decoupling network with decoupling members for both couplings and by correction of the controller output variables by means of feedforward control. An advantageously simple option to eliminate integrator windup when the manipulated variable limit is reached is to keep the state and the output variable of the corresponding controller constant. This makes it possible that, in a sign change of the control deviation at the input of the controller, the manipulated variable change immediately changes its sign as well. To prevent this measure from being rendered ineffective by a meanwhile large disturbance variable on the feedforward control, the decoupling members whose correcting quantities are routed to the feedforward control are advantageously configured in such a way that they also keep their states and correcting quantities constant when the manipulated variable limit is reached.

In a further improved embodiment of the decoupling member, the decoupling member keeps its corresponding correcting quantity constant when the manipulated variable limit is reached and adjusts its state as a function of the input variable so as to ensure bumpless changeover when the manipulated variable limit is reached.

Advantageously, a controller may be configured to be capable of being switched between manual and automatic operation in such a way that the changeover is bumpless and no abrupt or surge-like excitation of the corrected output variable of the controller, i.e., the manipulated variable of the system, is created. This prevents transient phenomena and unnecessary wear of the actuator being controlled.

If a controller generates an additional control signal, that is set in manual operation, and a predefined value of the correcting quantity is applied to the controller in manual operation by the corresponding decoupling member, an uncontrolled increase or drift of the correcting quantity, which might otherwise occur in the control unit due to the interconnection of the decoupling member, is advantageously eliminated. Pre-defining the value of the correcting quantity as zero in the manual operation has the advantage that the associated decoupling member does not cause any changes in the manipulated variable. Furthermore, a bumpless manual to automatic changeover is advantageously obtained in that the corresponding decoupling member sets its states to zero in manual operation, and in that a working point of the decoupling member is set by superposing a compensation quantity, such that the decoupling member produces the predefined value of zero. This working point is retained after the additional control signal has been reset, i.e., after a manual to automatic changeover.

BRIEF DESCRIPTION OF THE DRAWINGS

The invention as well as embodiments and advantages thereof will now be described in greater detail, by way of example, with reference to the drawings depicting embodiments in which.

DETAILED DESCRIPTION OF THE PREFERRED EMBODIMENTS

Figure 1:
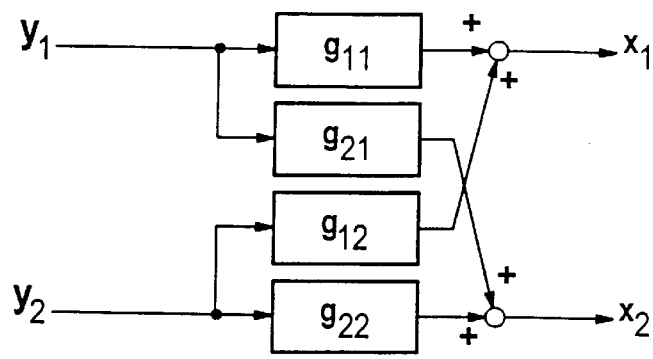
FIG. 1 is a block diagram of a conventional 2×2 multivariable system in P-canonical structure.
Figure 2:
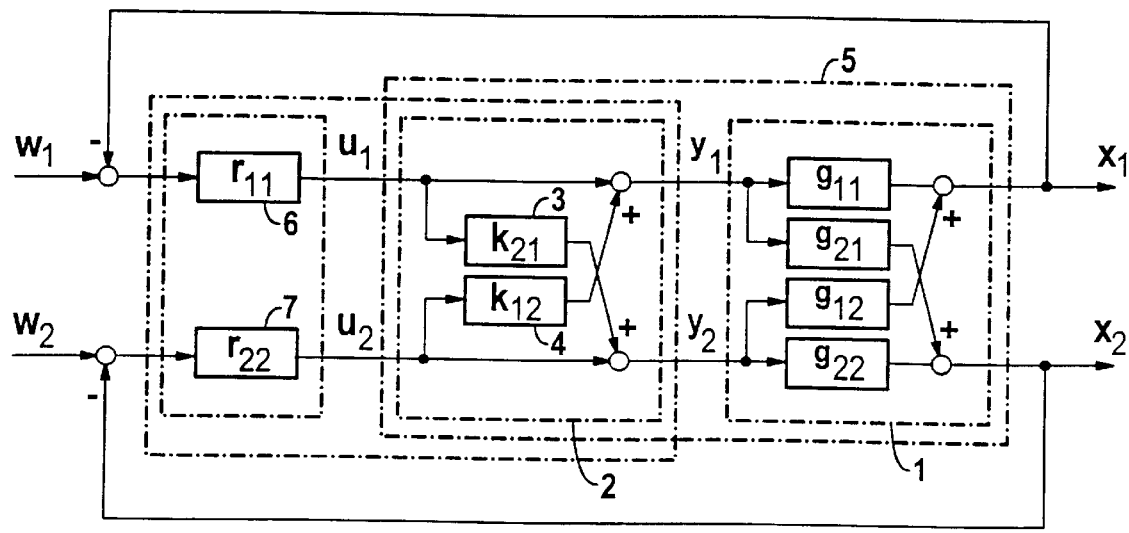
FIG. 2 is a block diagram of a further conventional 2×2 multivariable system with a decoupling network, as described by Engel.
Figure 3:
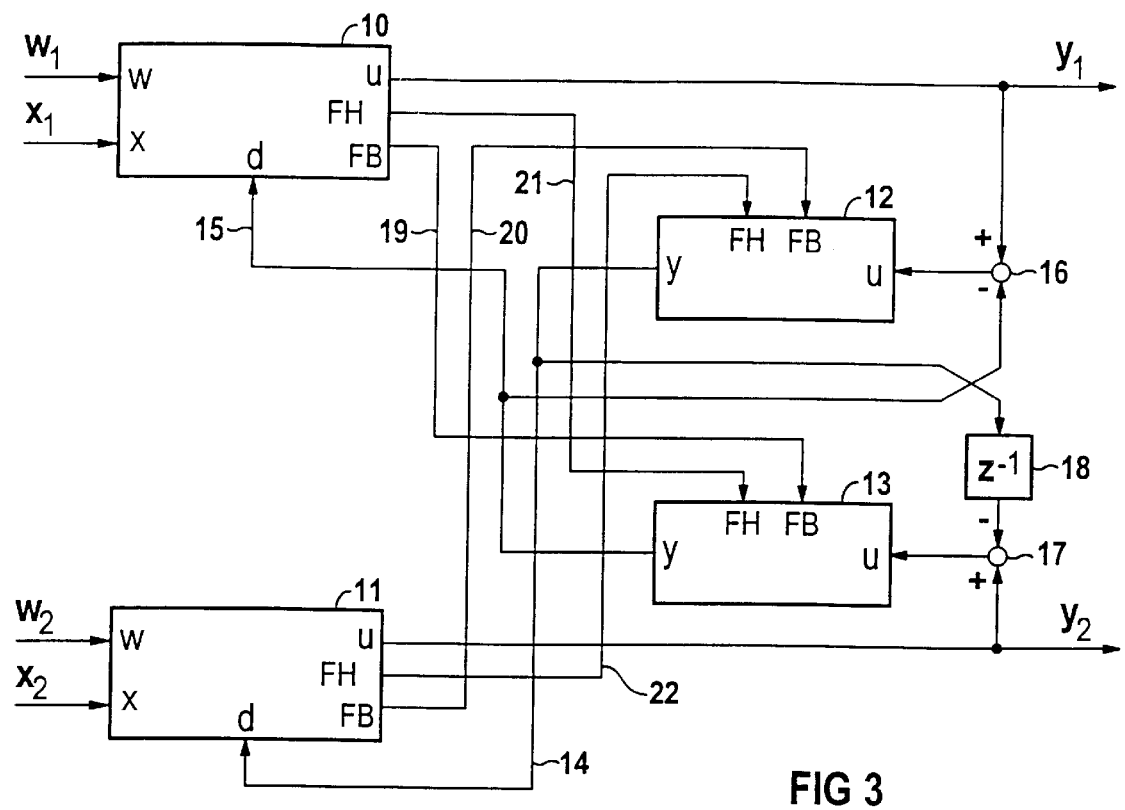
FIG. 3 is a block diagram of a control unit for a 2×2 multivariable system according to an embodiment of the invention.

FIG. 3 shows a control unit for a 2×2 multivariable system, i.e., a system with two manipulated variables $y_1$ and $y_2$ and two control variables $x_1$ and $x_2$. For the sake of clarity the system is not shown. To generate the manipulated variables $y_1$ and $y_2$, a corresponding PI controller 10, 11 is respectively provided, which internally forms a control deviation each from a reference magnitude $w_1$, $w_2$ and the control variable $x_1$, $x_2$ and calculates the manipulated variable $y_1$, $y_2$. Decoupling members 12 and 13 are determined in known manner to decouple the 2×2 multivariable system by a decoupling network in P-canonical form. Thus, in automatic operation, they realize transfer functions $k_{21}$, $k_{12}$, which correspond to the transfer functions of the decoupling members 3, 4 in FIG. 2. Correcting quantities 14, 15 supplied at the y outputs of the decoupling members 12 and 13 are routed to the d inputs of controllers 11, 10, which are provided for a device for feedforward control. The device for feedforward control corrects the corresponding control output variables. The corrected output variable is output at the u outputs of controllers 10, 11 and forms the manipulated variable $y_1$, $y_2$ for the 2×2 multivariable system. The corrected output variables $y_1$ or $y_2$, after deduction of the second correcting quantity 15 or the first correcting quantity 14, are switched by a subtracting element 16, 17 to the u inputs of the decoupling members 12, 13.

The described interconnection of controllers 10 and 11 as well as decoupling members 12 and 13 again produces a decoupling network in P-canonical form. The depicted interconnection has the advantage, however, that the strategies to eliminate integrator windup as well as to ensure bumpless manual to automatic changeover, which are successfully used in standard controllers for single variable systems, can now also be used for multivariable systems. A time-delay element 18 with the transfer function $z^{-1}$, which is used to delay values in a sample control by one sampling step, is connected upstream from the subtracting element 17 in the path of the first correcting quantity 14 in order to resolve the algebraic loop created by the interconnection of the decoupling network. Without this delay element 18, a circular signal flow would result in the block diagram according to FIG. 3 and the calculations in a sampling control could not be performed in one pass. An iterative calculation would have to be performed in each sampling step at great computational costs. This is advantageously eliminated by the additional delay element 18.

The first controller 10 and the second controller 11 at their FB output supply control signals 19 and 20, respectively, which indicate whether the correspondingly corrected output variable has reached a manipulated variable limit. The control signals 19 and 20 are routed to the second decoupling member 13 and the first decoupling member 12, which are configured such that they keep constant the second correcting quantity 15 and the first correcting quantity 14 when control signals 19 and 20 are set. This measure is advantageous particularly if the corresponding controller 10, 11 also keeps its state and output constant when the manipulated variable limit is reached. In this case, if there is a sign change in the control deviation, the corresponding manipulated variable change immediately changes its sign. This further improves the control response of the control unit after a manipulated variable limit has been reached. The decoupling members 12 and 13 keep their output constant until the corresponding manipulated variable has receded from the limit again and the corresponding control signal 20, 19 has been reset. After that, the decoupling members 12 and 13 return to automatic operation.

To ensure bumpless changeover from limit operation back to automatic operation, the decoupling members 12 and 13 adjust their state as a function of the respective signals applied to their u inputs when the control signals 20 or 19 are set.

In addition, the first controller 10 and the second controller 11 at their FH outputs each supplies additional control signals 21 and 22, respectively, which are set if the corresponding controller is in manual operation. Signals 21 and 22 are routed to the corresponding decoupling member 13, 12 to which they indicate whether manual operation has been set. The changeover of the mode of operation of the decoupling members 12 and 13 ensures that the magnitude of the signal present at the corresponding d input of the controller in manual operation does not increase or drift beyond all limits. Without this measure, for instance, if a constant manual value is predefined for controller 10, signal 15 on the d input of controller 10 could increase beyond all limits, although the transfer function of the decoupling member 13 is stable as such. For this reason it is advantageous to set all correcting quantities acting on the corresponding controller in manual operation to a defined value for the duration of manual operation. The value of zero has the advantage that the predefined manual value is output without change as a manipulated variable.

To ensure bumpless changeover from manual to automatic operation, the internal states and a working point of the decoupling member acting on the corresponding controller are set specifically. If manual operation is indicated, it is advantageous to set the internal states of the decoupling members also to zero and to select the working point, in such a way that the states and the output of the decoupling member when the respective input signal is present at the decoupling member are also calculated at zero and remain there so long as the input signal is constant. If a controller (for instance, controller 10 in FIG. 3) informs the associated decoupling member (in this example decoupling member 13) via the additional control signal (here control signal 21) that it is in manual operation, the state and output of the decoupling member 13 are set to zero and the working point is selected so that this value is maintained at the y output when the signal is constant at the u input. After resetting the additional control signal 21, i.e., after switching the controller 10 to automatic operation, the decoupling member 13 reassumes its actual transfer function, but now around the most recently valid working point. This measure is advantageous particularly if the control unit is used in processes without compensation, i.e., processes whose step response does not lead to a new steady state. A corresponding example are processes with integrating response. The control loop is started up in manual operation. Due to the described measure, the decoupling network is not allowed an independent transient condition, but is deliberately initialized, since, without the described operating mode changeover of the decoupling members, the correcting quantities could increase beyond all limits due to possibly unstable behavior.

The state equations for the transfer function of a linear dynamic decoupling member in "automatic" operation in which the corresponding control signal is not set, are as follows:

$$\underline{x}(k+1)=\underline{A}\cdot\underline{x}(k)+\underline{b}[u(k)+z(k)]$$

$$y(k)=\underline{c}^T\underline{x}(k)+d\cdot[u(k)+z(k)]$$

$$z(k+1)=z(k)$$

with $\underline{x}$—status vector $\underline{A}$—system matrix $\underline{b}$—input matrix with a number of columns of one, z—working point $\underline{c}^T$—transposed output matrix with a number of rows of one, and d—transit factor In "manual" operation, in which the additional control signal is set at the FH input, the state equations for the transfer function of the decoupling members are:

$$\underline{x}(k+1)=0$$

$$y(k)=0$$

$$z(k+1)=-u(k).$$

In "limit" operating mode in which the control signal is set at the FB input, the state equations for the transfer function of the decoupling members are:

$$\underline{x}(k+1)=[(1/\underline{c}^T(1))(y(k-1)-d[u(k)+z(k)]),0,0,\ldots,0]$$

$$y(k)=y(k-1)$$

$$z(k+1)=z(k)$$

where $\underline{c}^T$ (1) is the first component of the transposed output vector $\underline{c}^T$. If this component becomes zero, this circumstance is eliminated by rearranging the states.

The working point z is set by a compensation quantity, which is additively superimposed on the input variable u of the decoupling member. In "automatic" operation, the decoupling member operates around this working point according to its linear dynamics, which were determined for a decoupling network in P-canonical form. In "manual" operation, state x(k) and output y(k) are set to zero and the working point is selected such that state x(k) and output y(k) do not change if the input u(k) is constant. They also do not change directly after a changeover to "automatic" operation. This ensures a bumpless changeover. Output y(k) and working point z(k) are kept in "limit" mode and the state is continuously adjusted to ensure a bumpless changeover to "automatic" operation. To this end, the first component of the state vector x (k+1) is set to the indicated value, all other components are set to zero.

The above state equations apply to all decoupling members with dynamics. In a decoupling member with purely proportional characteristics, the state equations are eliminated since this state does not exist in such a decoupling member.

For practical reasons, decoupling members of a lower order are usually preferred. Transfer functions up to the 2nd order have proven to be successful. In many cases decoupling with a transfer function of the 1st order in which three parameters can be freely selected is already sufficient.

Implementation of new function modules for decoupling members with the aforementioned operating modes and state equations is comparatively complex, particularly if they must be integrated into an existing control/monitoring system and a signaling/alarm system in the context of a process control system. Since a PID controller is usually already available preassembled in system-conforming implementation, it is advantageous to implement decoupling members up to the 1st order through special parameterization of the existing standard PID controller. This presumes that the PID controller has a real D component, i.e., a D component which is subject to time-delay, with separately parameterizable delay time and a bipolar value range of the parameters in which negative values of the amplification and the time constants are also permissible. The transfer function of a real PID controller is:

$$r_{ij}(s)=k_p(1+(1/(t_i s))+(t_d s/(t_1 s+1)))$$

with $k_p$—controller amplification $t_i$—reset time $t_d$—rate time $t_1$—delay time constant of the D component, and s—Laplace operator To realize a decoupling member of the 1st order, the I component of the PID controller is switched off, i.e., the quotient $1/t_i s$ is set to zero and the equation of the thus-obtained PD controller is brought to the common denominator:

$$r_{ij}(s)=k_p((t_1+t_d)s+1)/(t_1 s+1)$$

The transfer function of a decoupling member of the 1st order, which was configured for a decoupling network in P-canonical form, in the Laplace range is:

$$k_{ij}(s)=k(t_2 s+1)/(t_3 s+1)$$

The comparison of the coefficients of the last two equations provides the parameters which must be set at the standard PID controller in order to obtain the desired response characteristics of the decoupling member. These are:

$$k_p=k$$

$$t_1=t_3$$

$$t_d=t_2-t_1$$

To realize the "limit" operating mode of a decoupling member thus implemented, the "manual" operating mode of the standard PID controller may be used. In "automatic" operation, the manual value of the PID controller is therefore corrected to the current value of the manipulated variable. In the changeover to "manual," the current value of the manipulated variable is frozen. The state of the PID controller in manual operation is in any case corrected in such a way that a bumpless changeover from "manual" to "automatic" is subsequently possible. To initialize a decoupling member thus implemented in manual operation of the main controller, it is possible to set the "correction" operating mode to the manipulated variable "zero" of the standard PID controller.

Advantageously, the bumpless manual to automatic changeover substantially reduces transient phenomena that would otherwise occur after adjustment of a working point in manual operation and changeover to automatic operation.

Figure 4:
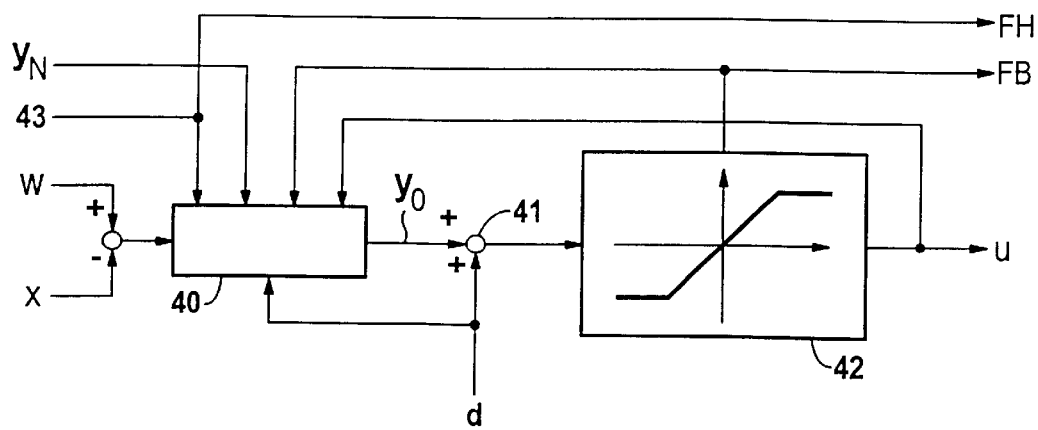
FIG. 4 is a structure diagram of a standard PI controller.

FIG. 4 shows a block diagram of a standard controller with a PI or PID controller core 40 to which a control deviation formed by a reference variable w and a control variable x is routed. To eliminate integrator windup and ensure bumpless manual/automatic changeover, the controller core 40 is additionally expanded by a few functions beyond the actual control algorithm. In automatic operation and when the manipulated variable limit is not reached, the controller core 40 generates an output variable $y_0$ in known manner according to the correspondingly used PI or PID algorithm. For instance, in a PID controller, the output variable $y_0$ is calculated by additive superposition of a P component $y_P$, an I component $y_I$ and a D component $y_D$. A disturbance variable d is superimposed on the output variable $y_0$ by a device for feedforward control 41, which may be realized, for instance, by a simple summing element. The output variable $y_0$ thus corrected is switched to a device 42 for manipulated variable limitation, which limits the corrected output variable to the manipulating range of an actuator (not depicted in FIG. 4) connected downstream from the controller. Device 42 forms the control signal FB, which indicates whether the corrected output variable $y_0$ has reached the manipulated variable limit. The limit of the controller thus affects the sum of the output variable $y_0$ and the disturbance variable present at the d input of the controller, which, in the interconnection of the standard controllers 10 and 11 shown in FIG. 3, is a correcting quantity generated by a decoupling member. If a control signal 43 is set, the controller is set to manual operation. The additional control signal FH may be directly derived from control signal 43. In manual operation, the controller outputs the value of a signal $y_N$ at its u output if said signal $y_N$ does not reach the manipulated variable limit. To ensure bumpless changeover from manual to automatic operation, the I component of the controller core 40 is initialized directly after automatic operation has been set by resetting signal 43 as follows:

$$Y_I=y_N-y_P-y_D-d$$

The control signal FB is routed to the controller core 40 and in the controller core initiates a strategy to eliminate integrator windup if the output variable $y_0$ of the controller core 40 corrected by the correcting quantity on the d input reaches a manipulated variable limit. One possibility to eliminate integrator windup is to use a quantity thus determined instead of the control deviation in the PID algorithm of the controller core, so that the corrected output variable of the controller corresponds precisely to the value of the manipulated variable limit. This strategy thus also takes into account the value at the d input of the controller. Another possibility to eliminate integrator windup is to keep constant the state and the output variable $y_0$ of the controller core 40 so long as the manipulated variable limit is reached and the control signal FB is set. This strategy has the advantage that immediately after a sign change in the control deviation, the manipulated variable change also changes its sign. This advantage is enhanced particularly in that decoupling members whose correcting quantities are routed to the d input of the controller also keep their correcting quantity constant as long as the control signal FB is set.

The structure of a control unit for a 3×3 multivariable system will now be described with reference to FIG. 5. The control unit comprises three controllers 50, 51 and 52, each of which may simply be embodied as a standard PI controller for single variable systems. Controllers 50, 51 and 52 each generate control variables $y_1$, $y_2$ and $y_3$, respectively, which are routed to a 3×3 multivariable system as a controlled system (not shown in FIG. 5). Control variables $x_1$, $x_2$ and $x_3$ read by the 3×3 multivariable system are compared in controllers 50, 51 or 52 with reference variables $w_1$, $w_2$ or $w_3$ and control deviations are calculated therefrom. Decoupling members 53, 54, 55, 56, 57 and 58 each serve to decouple the control variables $x_1$, $x_2$ and $x_3$ of the 3×3 multivariable system. These decoupling members were configured for a decoupling network with P-canonical structure. The decoupling member 53 realizes a transfer function $k_{21}$, the decoupling member 54 realizes a transfer function $k_{31}$, the decoupling member 55 realizes a transfer function $k_{12}$, the decoupling member 56 realizes a transfer function $k_{32}$, the decoupling member 57 realizes a transfer function $k_{13}$, and the decoupling member 58 realizes a transfer function $k_{23}$. The indices i and j in the designations of the transfer functions $k_{ij}$ indicate that the control variable $x_i$ with the same index i is decoupled by the corresponding decoupling member from control variable $x_j$ with the same index j. By a summing element 59, the correcting quantity formed by decoupling member 55 and the correcting quantity of decoupling member 57 are cumulated and the result is switched to the d input of the controller 50 and to a subtracting element 60. The subtracting element 60, in turn, subtracts this sum from the manipulated variable $y_1$ and thus forms input variables which are switched to the u inputs of the decoupling members 53 and 54. The d inputs of controllers 51 and 52 and the u inputs of decoupling members 55, 56, 57 and 58 are connected in analogous fashion. Time-delay elements 61 and 62 serve, just as the time-delay element 18 in FIG. 3, to resolve an algebraic loop in a time-discrete realization of the controller structure depicted. For multivariable systems with more than three inputs and outputs, the structure of the control unit shown in FIG. 5 may be expanded correspondingly.

Figure 5:
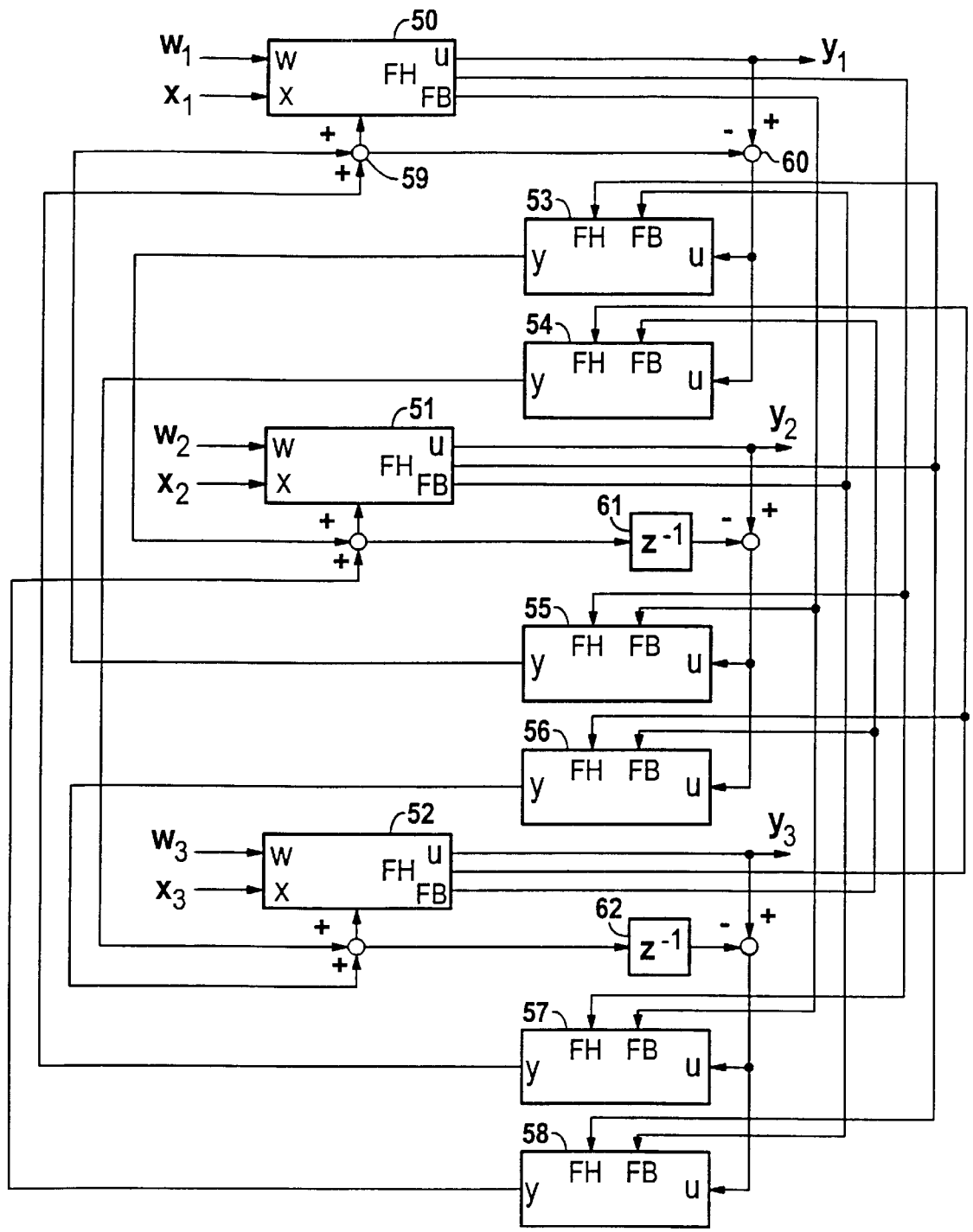
FIG. 5 is a block diagram of a control unit for a 3×3 multivariable system according to a further embodiment of the invention.

In the control units shown in FIGS. 3 and 5, decoupling members may be omitted if only weak or no couplings exist between the corresponding control variables. For instance, if decoupling member 13 in FIG. 3 is omitted, the summing element 17, the subtracting element 16 and the interconnection of the feedforward control of controller 10 may also be omitted.

In control units for multivariable systems as shown in FIGS. 2, 3 and 5, it should generally be noted that individual controllers should be put in manual operation only if the system satisfies the condition of general diagonal dominance. With respect to the definition of the general diagonal dominance of an n×n multivariable system, reference is made to "Regelungstechnik II: Mehrgrössensysteme, Digitale Regelung" [Control Technology II: Multivariable systems, Digital Control], J. Lunze, Springer Verlag Berlin, Heidelberg, N.Y., 1997, pp. 307 to 326, which is incorporated herein by reference.

The described control unit may be implemented as a time-discrete controller in an automation device or in an arithmetic unit of a process control system and as an analog controller with analog arithmetic blocks. In the latter case, the time-delay elements 18, 61 and 62 may be omitted.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A control unit for controlling a system with several coupled control variables comprising:

a plurality of controllers, each of which is associated with a control variable; and a decoupling network connected upstream from the system, said decoupling network comprising at least a first decoupling member to which a first output variable of a first one of said controllers is routed and which generates a first correcting quantity for a second output variable of a second one of said controllers to reduce the coupling between the first and second control variables;

wherein said second controller comprises a PI or PID controller core and is configured such that a value of an integral action component and the second output variable of said second controller are kept constant when the second output variable of said controller core of said second controller corrected with the first correcting quantity reaches a manipulated variable limit.

2. The control unit of claim 1, wherein the first decoupling member generates the first correcting quantity in accordance with a first transfer function which is determined for said decoupling network in P-canonical form, and wherein said second controller comprises a device for feedforward control to which the first correcting quantity is routed.

3. The control unit of claim 2, wherein said decoupling network comprises a second decoupling member to which the second output variable of said second controller is routed after deduction of the first correcting quantity and which generates a second correcting quantity for the first output variable of said first controller in accordance with a second transfer function which is determined for said decoupling network in P-canonical form;

the first output variable of said first controller after deduction of the second correcting quantity is routed to said first decoupling member;

said first controller comprises a PI or PID controller core and a device for feedforward control to which the second correcting quantity is routed; and said first controller is configured such that a value of an integral action component and the first output variable of said first controller are kept constant when the first output variable of said first controller corrected by the second correcting quantity reaches the manipulated variable limit.

4. The control unit of claim 1, wherein said second controller generates a control signal which is set when the manipulated variable limit is reached, and wherein said first decoupling member is configured such that it keeps constant its state and the first correcting quantity when the control signal is set.

5. The control unit of claim 1, wherein said second controller generates a control signal which is set when the manipulated variable limit is reached, and wherein said first decoupling member is configured such that it keeps constant the first correcting quantity when the control signal is set and adjusts its state, to ensure bumpless changeover when the manipulated control variable limit is no longer being reached.

6. The control unit of claim 1, wherein at least said second controller is configured to be switched between manual and automatic operation, to ensure bumpless changeover with respect to the second output variable of said second controller.

7. The control unit of claim 6, wherein said second controller generates an additional control signal which is set in manual operation, and wherein said first decoupling member is configured such that it generates a predefined value of the first correcting quantity when the additional control signal is set.

8. The control unit of claim 7, wherein the predefined value is zero.

9. The control unit of claim 8, wherein said first decoupling member is configured such that its state is set to zero when the additional control signal is set;

through superposition of a compensation quantity, a working point of said first decoupling member is set such that it generates the predefined value zero; and the working point is retained after the additional control signal is reset.

* * * * *